United States Patent [19]
Streeter et al.

[11] 3,820,407
[45] June 28, 1974

[54] CLUTCH MECHANISMS

[75] Inventors: John H. Streeter, Berkhamsted; Roger M. Jenkins, Hitchin, both of England

[73] Assignee: Revenue Systems Limited, Harpenden, England

[22] Filed: Nov. 14, 1972

[21] Appl. No.: 306,281

[52] U.S. Cl. .............................. 74/112, 74/125.5
[51] Int. Cl. ............................................ F16h 27/00
[58] Field of Search ......... 74/112, 116, 567, 55, 25, 74/125.5

[56] References Cited
UNITED STATES PATENTS

| | | | |
|---|---|---|---|
| 715,975 | 12/1902 | Carichoff | 74/112 |
| 2,297,090 | 9/1942 | Weaver | 74/567 |
| 2,980,326 | 4/1961 | Crooke | 74/112 |
| 3,132,527 | 5/1964 | Rocton | 74/112 |
| 3,136,168 | 6/1964 | Matovich, Jr. | 74/125.5 |
| 3,225,875 | 12/1965 | Thomas et al. | 74/25 |
| 3,340,743 | 9/1967 | Stageberg | 74/116 |
| 3,516,267 | 6/1970 | Uhlir | 74/25 |

Primary Examiner—Samuel Scott
Assistant Examiner—Wesley S. Ratliff, Jr.
Attorney, Agent, or Firm—Eyre, Mann & Lucas

[57] ABSTRACT

The invention relates to clutch mechanisms for converting the continuous rotation of a drive shaft to intermittent or oscillatory motion of a driven member. The drive shaft carries a clutch drum surrounded by a clutch band fixed at one end to a pin on the driven member. The other end of the clutch band is secured to a pivoted operating lever also mounted on the driven member. A cam follower mounted on the operating lever co-operates with an arcuate cam surface coaxial with the driven member to maintain the lever in a position in which it tightens the clutch band around the clutch drum while the driven member rotates through a predetermined angle.

11 Claims, 4 Drawing Figures

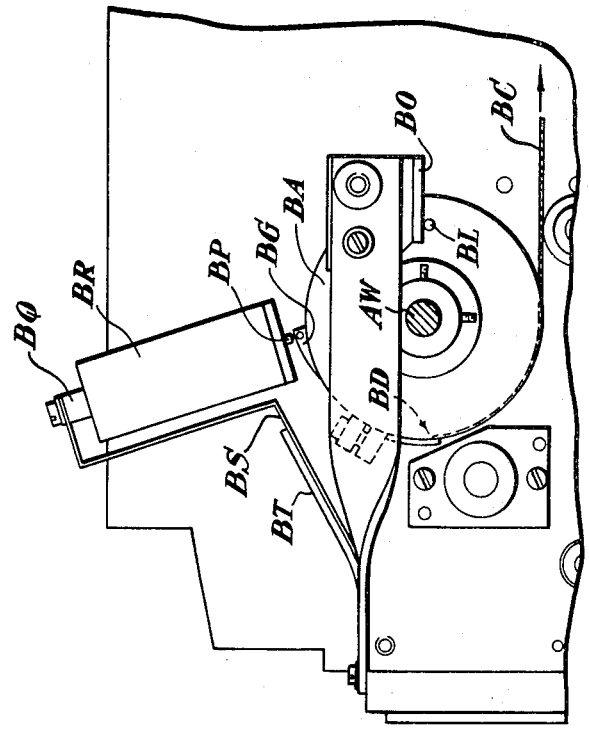
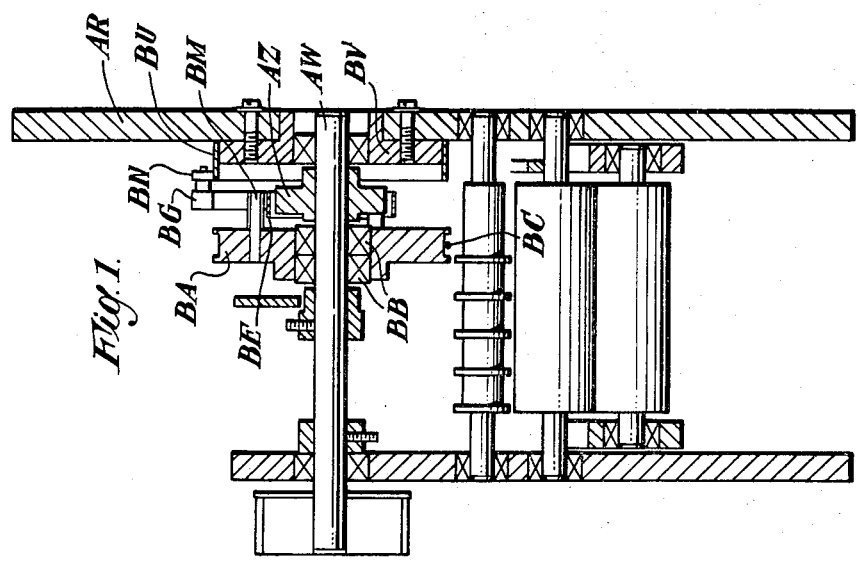

CLUTCH MECHANISMS

This invention relates to clutch mechanisms and it is an object of the invention to provide a clutch mechanism which is particularly suitable for converting the continuous rotation of a drive shaft to intermittent, and in particular to oscillatory, motion of a driven member. A clutch mechanism in accordance with the invention enables the driven member to be rotated through an accurately predetermined angle and is, therefore, particularly suitable for producing reciprocating motion of a movable carriage as described, for example, in United Kingdom Patent Specification No. 1,249,061.

From one aspect the invention consists in a clutch mechanism including coaxial driving and driven members, an operating lever mounted on said driven member so that it is pivotable from a first position in which the driving and driven members are uncoupled to a second position in which the driving and driven members are coupled, an arcuate cam surface coaxial with said driven member, and a cam follower mounted on said operating lever and co-operating with said cam surface to maintain said lever in said second position as said driven member rotates through a predetermined angle.

The clutch mechanism may include a right circular cylindrical member provided with two gaps extending parallel to the axis of said cylinder from one end thereof, the arcuate cam surface being constituted by the inner surface of a portion of said cylinder extending between said two gaps. It is to be understood that spring means are provided to urge the operating lever towards the first position and stop means are provided to maintain the driven member in a rest position in which the cam follower is located radially outwardly of one of the gaps in the cylinder. Control means are provided to move the cam follower inwardly through said gap to said second position and when the operating lever is in said second position, the driven member is coupled to the driving member and is rotated thereby. As a result, the cam follower is moved away from the gap in the cylinder and engages the arcuate surface constituted by the interior wall of the cylinder. The cam follower is retained within the cylinder until it reaches the second gap, whereupon it is moved outwardly by the spring means to the first position in which the driving and driven members are uncoupled. Further spring means may be provided to cause the driven member to rotate back to its rest position against the stop, the cam follower travelling on the outer surface of the cylinder during this return movement.

The cylindrical member may be formed, for example, by a cam band of hard spring material stretched taut around a stationary disc. The width of the cam band is greater than the width of the disc and the two gaps are provided in the portion of the band that is not in engagement with the disc.

The driving and driven members may be coupled by a clutch drive band surrounding a clutch drum constituting, or rotating with, the driving member. One end of said band is fixed to said driven member and the other end of said band is fixed to the end of the operating lever remote from the cam follower. Spring means are provided to urge the lever in the direction necessary to loosen the band on the clutch drum. Movement of the operating lever against the action of said spring means will tighten the band on the drum and cause the driven member to rotate with the drum.

From another aspect the invention consists in any novel features of the embodiment illustrated in the accompanying diagrammatic drawings, in which:

FIG. 1 is a cross-sectional side view of a clutch mechanism in accordance with the invention;

FIG. 4 is a rear view of the clutch mechanism illustrating the stop means for the driven member.

Figure 2:
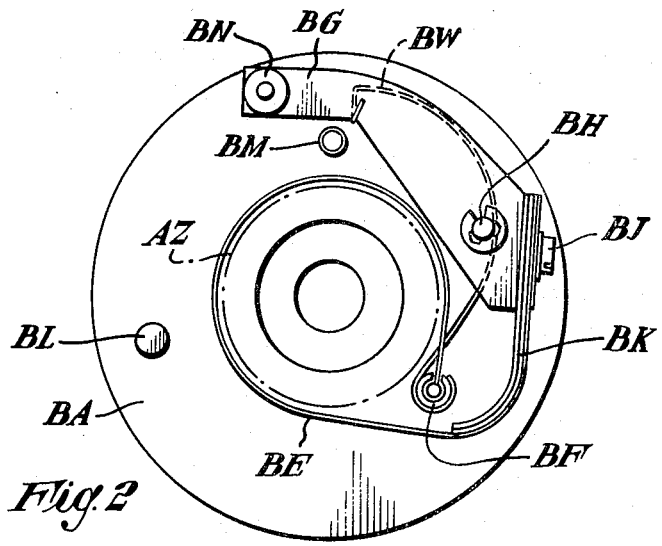
FIG. 2 is an end view of the driven member and operating lever of the clutch mechanism illustrated in FIG. 1.

The clutch mechanism illustrated in the drawings includes a driving shaft AW and fixed thereto a clutch drum AZ consisting of non-magnetic stainless steel. The shaft AW also carries a pulley BA mounted on two ball bearings BB so that it is rotatable with respect to the shaft. A cable BC (FIG. 4) is fixed to the pulley BA at BD and the other end of the cable is secured to spring means tending to urge the pulley in an anticlockwise direction as seen in FIG. 4, so that a stop pin BL fixed to the pulley BA is urged against a rubber stop member BO.

A clutch drive band BE consisting of beryllium copper surrounds the clutch drum AZ and is fixed at one end to a pin BF (FIG. 2). Also fixed to the pulley BA is a pivot BH for an operating lever BG. One end of the operating lever carries a cam follower BN and the other end of the operating lever is attached to the drive band BE by a screw BJ. A spring BW biasses the operating lever BG in a clockwise direction as seen in FIG. 2. Movement of the lever in an anticlockwise direction is limited by a stop pin BM and leaf springs BK are provided to back up the outer end of the drive band BE.

The cam follower BN is in the form of a ball bearing, the inner race of which is a push fit on a pin projecting perpendicularly from the lever BG. The cam surface with which the cam follower co-operates is constituted by a cam band BU consisting of hard spring material and stretched taut around a disc BV secured to a part AR of the frame of the mechanism.

Figure 3:
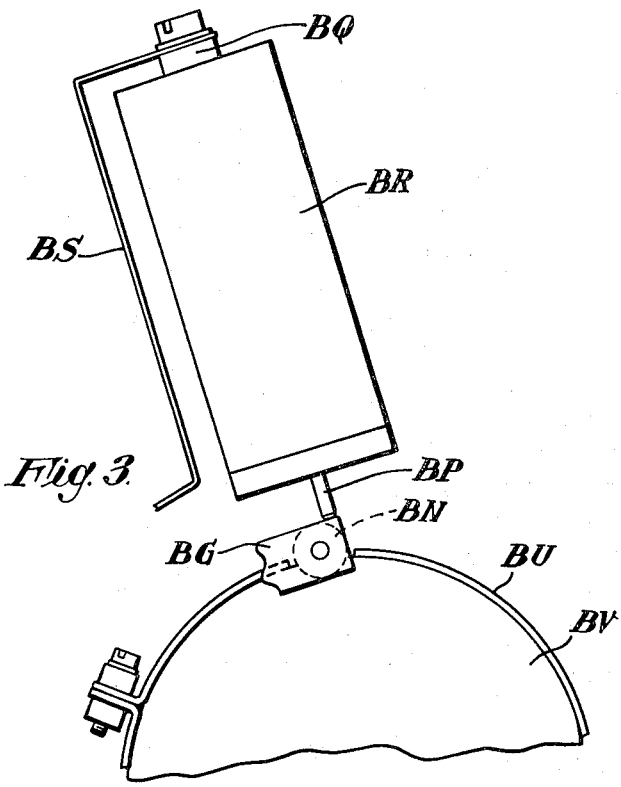
FIG. 3 illustrates the means for moving the operating lever.

In the rest position of the mechanism, the tension on the cable BC holds the pulley BA with the pin BL against the stop block BO and in this position the ball bearing BN is opposite a gap in the overhang of the cam band BU. In this position also, the tip of the lever BG rests on the end of a push rod BP (FIGS. 3 and 4) attached to the armature BQ of an electromagnet BR. A bent leaf spring BS stopped by a leaf BT determines the rest position of the armature BQ. If the armature is energised, the push rod BP is moved outwardly of the electromagnet and causes the tip of the lever BG to move towards the centre of the pulley BA, the bearing BN passing through the slot in the band BU. Rotation of the lever BG tightens the drive band BE on the clutch drum AZ coupling the pulley BA to the drum AZ through the fixing point BF. Assuming that the shaft AW is rotating, rotary motion is imparted to the pulley BA and the ball bearing BN is moved on the inner surface of the cam band BU, past the gap in the band. As a result, drive is maintained on the pulley BA which is rotated with the bearing BN rolling around the inside of the overhang of the band. When the bearing BN reaches the second gap in the overhang of the band BU, it is rotated in a clockwise direction as seen in FIG. 2, by the action of the spring BW and passes outwardly through the gap. As a result, the lever releases the drive from the pulley BA, which is thereafter rotated in the opposite direction by the action of the spring on the cable BC. During this return motion, the bearing BN travels on the outside of the band BU until it is again opposite the first gap when the pin BL strikes the rubber stop BO.

What is claimed is:

1. A clutch mechanism including coaxial driving and driven members, an operating lever mounted on said driven member so that it is pivotable from a first position in which the driving and driven members are uncoupled to a second position in which the driving and driven members are coupled, an arcuate cam surface coaxial with said driven member, and a cam follower mounted on said operating lever and co-operating with said cam surface to maintain said lever in said second position as said driven member rotates through a predetermined angle.

2. A clutch mechanism as claimed in claim 1, wherein the clutch mechanism includes a right circular cylindrical member provided with two gaps extending parallel to the axis of said cylinder from one end thereof, the arcuate cam surface being constituted by the inner surface of a portion of said cylinder extending between said two gaps.

3. A clutch mechanism as claimed in claim 2, wherein spring means are provided to urge the operating lever towards the first position and stop means are provided to maintain the driven member in a rest position in which the cam follower is located radially outwardly of one of the gaps in the cylinder.

4. A clutch mechanism as claimed in claim 3, wherein control means are provided to move the cam follower inwardly through said gap so that the operating lever is moved to said second position and the driven member is coupled to the driving member.

5. A clutch mechanism as claimed in claim 4, wherein, when the driven member is rotated by the driving member, the cam follower is moved away from the gap in the cylinder and engages the arcuate surface constituted by the interior wall of the cylinder so that it is retained within the cylinder until it reaches the second gap.

6. A clutch mechanism as claimed in claim 5, wherein further spring means are provided to cause the driven member to rotate back to its rest position against the stop when the driving and driven members are uncoupled, and wherein the cam follower travels on the outer surface of the cylinder during this return movement.

7. A clutch mechanism as claimed in claim 2, wherein the cylindrical member is formed by a cam band of hard spring material stretched taut around a stationary disc, the width of the cam band being greater than the width of the disc and the two gaps being provided in the portion of the band that is not in engagement with the disc.

8. A clutch mechanism as claimed in claim 1, including a clutch drive band surrounding a clutch drum constituting the driving member.

9. A clutch mechanism as claimed in claim 8, wherein one end of said drive band is fixed to said driven member and the other end of said drive band is fixed to the end of the operating lever remote from the cam follower.

10. A clutch mechanism as claimed in claim 9, wherein spring means are provided to urge the lever in the direction necessary to loosen the band on the clutch drum, and wherein movement of the operating lever against the operation of said spring means tightens the band on the drum and causes the driven member to rotate with the drum.

11. A clutch mechanism including coaxial driving and driven members, a friction clutch mounted on said driven member, a clutch operating lever mounted on said driven member in operating relationship with said clutch and pivotable from a first position in which said clutch is in a declutched state to a second position in which said clutch frictionally clutches together said driving and driven members for mutual rotation, control means to move said operating lever from said first position to said second position at a selected instant, an arcuate cam surface coaxial with said driven member, and a cam follower mounted on said operating lever and co-operating with said cam surface to maintain said operating lever in said second position while said driven member is rotated by said driving member through a predetermined angle, said cam surface being structured to allow said operating lever to return to said first position after said driven member is rotated by said predetermined angle.

* * * * *

UNITED STATES PATENT OFFICE
CERTIFICATE OF CORRECTION

Patent No. 3,820,407            Dated June 28, 1974

Inventor(s) John H. Streeter and Roger M. Jenkins

It is certified that error appears in the above-identified patent and that said Letters Patent are hereby corrected as shown below:

Foreign Application Priority Data:

November 16, 1971 - Gt.Britain..............53126/71

Signed and sealed this 29th day of October 1974.

(SEAL)
Attest:

McCOY M. GIBSON JR.            C. MARSHALL DANN
Attesting Officer               Commissioner of Patents